Jan. 14, 1969  R. E. GRUBAUGH ET AL  3,422,439
SHOCK RECORDER USING ECCENTRICALLY-WEIGHTED GEARS
Filed Feb. 24, 1967
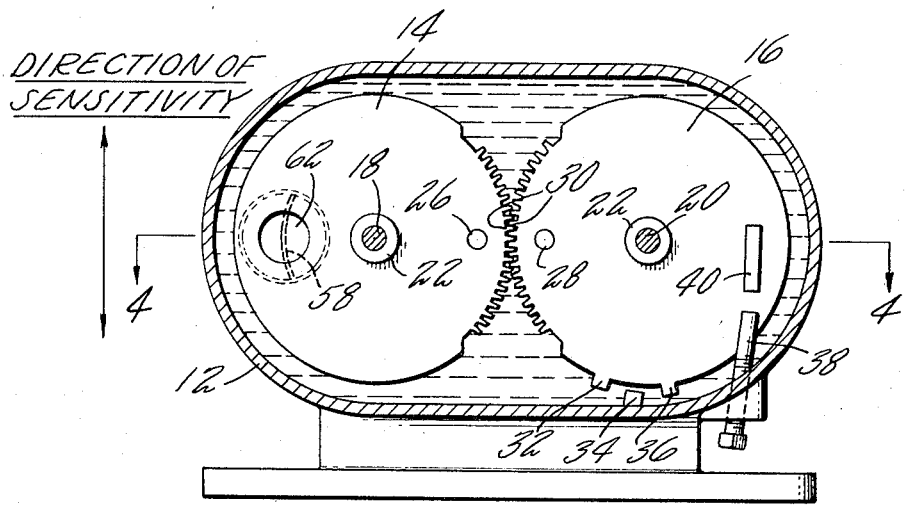
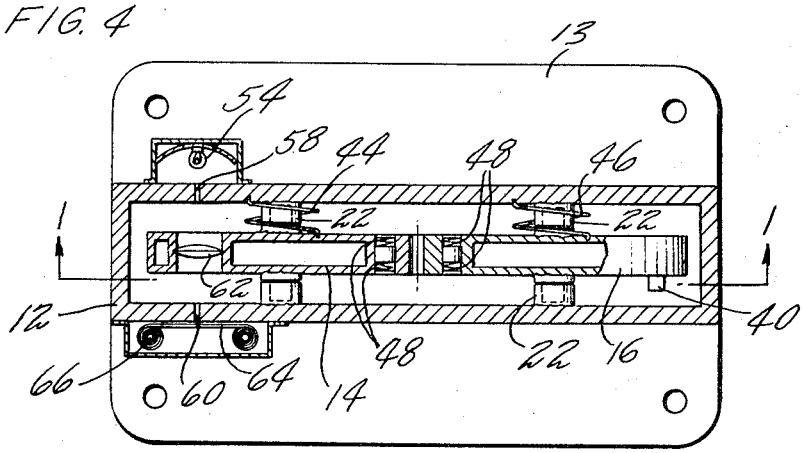
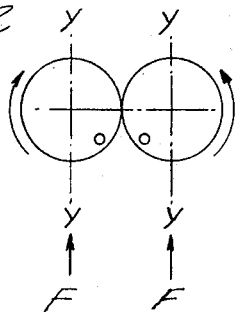
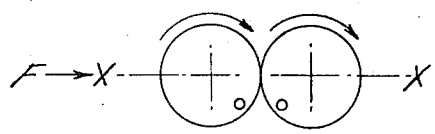
INVENTORS
ROBERT E. GRUBAUGH
LEE E. ELLIOTT
BY
ATTORNEY United States Patent Office 3,422,439
Patented Jan. 14, 1969

3,422,439
SHOCK RECORDER USING ECCENTRICALLY-WEIGHTED GEARS
Robert E. Grubaugh, Sherman Oaks, and Lee E. Elliott, Los Angeles, Calif., assignors to United Aircraft Corporation, East Hartford, Conn., a corporation of Delaware
Filed Feb. 24, 1967, Ser. No. 618,532
U.S. Cl. 346—7
Int. Cl. G01d 9/00
6 Claims

ABSTRACT OF THE DISCLOSURE

Two eccentrically-weighted gears, rotatably disposed in a fluid, are neutrally buoyant and meshed to rotate in opposite directions in the same plane when disturbed by ground-motion pulses. A reflected light beam gives a visual indication of the gear movement.

BACKGROUND OF THE INVENTION

Field of the invention

This invention relates to seismographs and related apparatus that measure ground-motion pulses (such as shock waves and vibrations) and more particularly to improved accuracy therein.

Description of the prior art

In general, the seismographs of the prior art depend upon the changing motion of a large mass suspended at the end of a pendulum or filament to provide an indication of ground motion. When the frame of the apparatus supporting the mass receives a ground-motion pulse, the mass tends to move or vibrate with respect to the rest of the instrument. Some of these devices employ a reflector attached to the suspended mass to reflect a beam of light to an observation point. Other devices depend on the movement of cooperating gears and drums to measure the ground vibration. Another type of apparatus utilizes a vibrating medium, such as water, to transmit the vibration to a reflector, which is suspended on top of the liquid. The reflector reflects a spot of light onto a screen.

In the field of seismological recording, the instruments used heretofore are unduly large in size and are not easily moved from one place to another. The physical orientation of these devices is usually permanent (because they may be dependent on gravity) and they are not readily adapted to read the ground-motion forces in orientations other than the horizontal.

Friction between mechanical parts, in the instruments used heretofore, introduces error and decreases the accuracy in deriving ground displacement histories.

In all of the above-mentioned prior devices, forces arriving from orientations other than the desired orientations, may be transmitted to the shock recording mechanism, and may have objectionable cross coupling effects on the reading.

SUMMARY OF INVENTION

Therefore, an object of the invention is to provide a highly directional, accurate, essentially frictionless seismograph, operable in any orientation for measuring ground-motion pulses.

In accordance with the present invention, directional sensitivity of the shock-measuring instrument is greatly enhanced by utilizing a pair of eccentrically-weighted members that cooperate for complementary rotation in the same plane, thus limiting sensitivity of the instrument to motion components along a particular desired axis. Sensitivity to shock pulses arriving along any other than the sensitive axis is greatly reduced. Friction between moving mechanical parts may be substantially eliminated by utilizing special frictionless bearings. In the preferred embodiment of this invention, the eccentrically-weighted members are submerged in a fluid to create a condition of neutral buoyancy that enables the instrument to operate in an essentially frictionless environment.

Due to the torque effect of gravity acting on the eccentrically-weighted members in shock-measuring orientations other than the horizontal, the preferred embodiment of this invention employs a pair of balanced restoring springs. These springs cooperate with special magnetic arrestors to center the eccentrically-weighted members and hold them in a zero initial position.

The invention according herewith provides a portable, compact, self-recording instrument. The foregoing and other objects, features and advantages of the present invention will become more apparent in the light of the following detailed description of a preferred embodiment thereof, as illustrated in the accompanying drawings.

BRIEF DESCRIPTION OF THE DRAWINGS

FIGURE 1 is a sectional side view of a preferred embodiment of the invention taken along line 1—1 in FIGURE 4.

FIGURE 2 is a diagram of a force acting along the Y axis in the plane of the gears.

FIGURE 3 is a diagram of a force acting along the X axis in the plane of the gears.

FIGURE 4 is a sectional top view of the device taken along line 4—4 in FIGURE 1.

DESCRIPTION OF THE PREFERRED EMBODIMENT

Referring generally to the preferred embodiment of FIGURE 1, an instrument housing 12 disposed on a base 13, contains the major components of the apparatus and is filled with a fluid. Two neutrally buoyant gears 14, 16 are fixedly attached to shafts 18 and 20 inside the housing 12. These gears, either hollow or solid, may be made of any material that will render them neutrally buoyant when submerged in fluid. The proper choice of fluid, and material for the gears, determines the degree of buoyancy achieved. In order for these gears to mutually cooperate for complementary angular rotation in the same plane, each gear has fine gear teeth 30 meshed with like teeth on the other gear.

The ends of the shafts 18 and 20 may be disposed in bearings 22, which may be recessed in the sides of housing 12. The term "neutral buoyancy" used herein implies that the buoyant force upon the gears is neutral. That is, if the gears are placed in a container of fluid, they will neither sink to the bottom nor will they float on the top; because they are neutrally buoyant the gears will tend to float in their respective bearings, thereby minimizing contact forces on the bearing surface.

A perfectly balanced gear does not develop angular momentum when disturbed by a shock. However, when the same gear is eccentrically weighted; the gear is placed in an unbalanced state and shock transmitted to the gear causes it to move. To develop this motion (angular momentum), a pair of eccentric weights 26 and 28 are mounted near the periphery of gears 14 and 16. Assuming that the gears are practically frictionless on their bearings, a very slight shock will impart a rotation to the gears having a magntide proportional to the linear displacement of the ground-motion pulse along the axis of instrument sensitivity.

A better understanding of the highly directional characteristics of the instrument can be realized at this point by referring to FIGURES 2 and 3. Forces acting perpendicular to the plane of the gears have no effect on their rotation and, therefore, are not illustrated.

FIGURE 2 shows a force F acting upon gears 14, 16 in the direction of sensitivity along the Y axis. The effect of this force is to produce a clockwise angular rotation in gear 14 and a counterclockwise angular rotation in gear 16. The movement of the gears is equal in magnitude, cooperative, but opposite in direction.

FIGURE 3 illustrates a force F acting upon gears 14, 16 along the X axis. A clockwise angular rotation is imparted to each gear. Because the gears cannot cooperate to rotate in the same direction, the result is a zero angular rotation.

Employing two eccentrically-weighted gears instead of a single gear insures that the direction of sensitivity of the instrument is confined to a single axis. The proportionality or reduction factor between the displacement magnitude of the ground motion pulse and the angular rotation of the gears is a design parameter that is determined by the size of the gears, their eccentricity and their moment of inertia. The instrument is, therefore, constructed for whatever maximum linear displacement is to be measured for the conditions of interest. An angular rotation limit of a few degrees is considered sufficient to measure a ground-motion pulse of maximum magnitude with the desired accuracy.

Referring to FIGURE 1, a set of limit stops 32 and 36, disposed on gear 16, cooperate with a limit stop 34 mounted on housing 12 to limit the angular rotation of the two gears to plus or minus 10 degrees of maximum travel.

A pair of magnetic arrestors 38 and 40 are provided to help center the eccentric gears and hold them in a zero initial reference position. The magnetic force may be varied by increasing or decreasing the space between the two magnets by any convenient means, e.g., providing threads on magnet 38 to make it adjustable.

The two gears are held in a null or zero reference position by the cooperating effect of magnetic arrestors 38, 40 and restoring springs 44, 46 (hereinafter described with respect to FIGURE 4). Further, these magnetic arrestors and springs restore the gears to this zero initial position after they have been displaced by a ground-motion pulse.

Referring to FIGURE 4, a pair of restoring springs 44 and 46 are located between each gear and the inner housing wall. One end of each spring is attached to the wall of the housing 12 and the other end of each spring is attached to its respective gear 14, 16.

If the instrument is orientated with its base 13 in the vertical plane and its gears lying in the horizontal plane, the restoring springs 44, 46 and magnetic arrestors 38, 40 can be eliminated, i.e., the effect of gravity acting on the eccentric weights does not have to be taken into consideration. To restore the gears to their zero initial position, any mechanical means well known in the art can be used.

In order to provide the most accurate measurement of ground displacements possible, the restoring springs 44, 46 and magnetic arrestors 38, 40 are designed to produce a very low undamped natural frequency of instrument response.

The instrument can be used as an accelerometer, velocity meter or other type of vibration meter by changing the natural frequency and amount of damping, thereby altering the response characteristics as desired.

To aid in damping out and eliminating unwanted pulses arriving normal to the plane of the gears 14, 16, each eccentric weight 26, 28 is set into the periphery of its gear along with two shock springs 48, one spring located on each side of the weight. The eccentric weights are free to slide laterally in their respective gears, and the effect of the shock springs 48 is to absorb these undesired pulses.

To record permanently the displacement time histories, an optical system such as the direct optical system illustrated in FIGURE 4 is utilized. It consists of a fixed light source 54, a focusing lens 62 mounted in the side of gear 14, and a moving strip of light sensitive paper 64 on which the light rays impinge. A pair of slits 58 and 60 are provided in each side of the housing 12 to form a path for the light beam between the light source 54 and light sensitive paper 64. When the gears rotate, the focal point of the lens moves a corresponding amount and causes motion of the spot of light across the paper 64. Another method of measuring the angular rotation of the gears employs a movie camera to photograph the gear which is marked so that its rotation can be observed. Of course, other suitable means may be used to measure the angular rotation of the gears, e.g., reflecting a pencil-like light beam off a mirror surface on one of the gears.

In operation, the instrument is oriented so that the plane of the gears is parallel to the direction of sensitivity, i.e., the direction or origin of the expected ground-motion pulse. The apparatus is essentially insensitive to forces induced by ground-motion pulses arriving perpendicular to the plane of the gears. Motion of the ground and the instrument base in the direction of sensitivity causes rotation of the neutrally buoyant gears 14 and 16. As gear 14 turns, the spot of light focused by lens 62 traverses the paper 64 thereby forming a permanent record of the shock.

Having thus described a preferred embodiment of our invention, what we claim as new and desire to secure by Letters Patent of the United States is:

1. A device for measuring and recording shock pulses comprising:
   a pair of rotatably disposed cylindrically-shaped, neutrally buoyant eccentrically-weighted inertia means rotatable about their centerline, said pair of eccentrically-weighted inertia means being in engagement with each other so as to cooperate for complementary rotation in the same plane;
   sensing means for sensing the degree of motion of said eccentrically-weighted inertia means;
   said sensing means comprises:
      a light source;
      a focusing lens mounted in one of said eccentrically-weighted inertia means;
      a light-sensitive recording means; and
      said container having optical light slits to provide a path for a beam of light emanating from said light source whereby said beam of light passes through said slits and said lens to form an image on said light-sensitive recording means.

2. A device according to claim 1 wherein said eccentrically-weighted inertia means comprises a pair of mating spur gears.

3. A device for measuring and recording shock pulses comprising:
   a container filled with a fluid,
   a pair of interconnected, eccentrically-weighted cylindrically-shaped inertia means rotatably supported about their centerline within said fluid, said pair of eccentrically-weighted inertia means being neutrally buoyant in said fluid and cooperating for complementary rotation in the same plane;

magnetic means to restore and hold said eccentrically-weighted inertia means in a zero initial position;

spring means for restoring and holding said eccentrically-weighted inertia means in a zero initial position;

said magnetic means cooperating with said spring means to restore and hold said eccentrically-weighted inertia means in a zero initial position;

and sensing means for sensing the degree of motion of said eccentrically-weighted inertia means.

4. A device for measuring and recording shock pulses according to claim 3 wherein each of said eccentrically-weighted inertia means further comprises:

an eccentrically disposed weight therein;

shock means cooperating with said eccentrically disposed weight to damp out and absorb any lateral movement of said eccentrically disposed weight.

5. The device described in claim 3 further comprising: stop means to limit the angular rotation of said pair of eccentrically-weighted inertia means.

6. A device for measuring and recording shock pulses according to claim 3 wherein:

each of said eccentrically-weighted inertia means is provided with teeth, said teeth meshing to provide said interconnection between said eccentrically-weighted inertia means.

References Cited

UNITED STATES PATENTS

| 939,999 | 11/1909 | Fraser et al. | 346—108 X |
| 2,797,911 | 7/1957 | Montgomery | 73—516 |
| 2,959,057 | 11/1960 | Winker | 73—516 |

FOREIGN PATENTS 1,060,073  11/1953  France.

RICHARD B. WILKINSON, *Primary Examiner.*

J. W. HARTARY, *Assistant Examiner.*

U.S. Cl. X.R.

73—71.1, 516; 346—108